United States Patent Office 2,955,119
Patented Oct. 4, 1960

2,955,119

METHOD OF PREPARATION OF 1,4-PREGNADIENES

William S. Allen and Seymour Bernstein, Pearl River, N.Y., assignors to American Cyanamid Company, New York, N.Y., a corporation of Maine No Drawing. Filed Sept. 13, 1956, Ser. No. 609,528

4 Claims. (Cl. 260—397.45)

This invention relates to new steroids of the pregnene series and methods of preparation thereof.

The novel compounds of the present invention can be illustrated by the following general formula

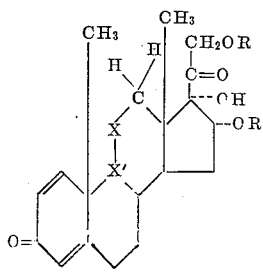

in which XX' is a radical selected from the group consisting of HC=C and

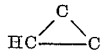

radicals and R is a member selected from the group consisting of hydrogen and lower alkanoyl radicals.

The present compounds are generally solids having a definite melting point (in excess of 200° C.). They are insoluble in water and soluble in organic solvents such as chloroform, carbon tetrachloride, and the like.

The starting materials used in the process of the present invention are described and claimed in our copending application Serial No. 590,791, filed June 11, 1956, now U.S. Patent 2,806,043. These compounds can be, for example, 11β,16α,17α,21-tetrahydroxy-1,4-pregnadiene-3,20-dione and the 16α,21-esters thereof.

The compounds of the present invention are useful as intermediates in the preparation of the highly active Δ$^{1,4}$-pregnadienes of our copending application Serial No. 574,981, filed March 30, 1956, now U.S. Patent 2,789,118. They can also be used in preparing other steroids, particularly substituted Δ$^{1,4}$-pregnadienes.

In preparing the compounds of the present invention, a 16α,21 - dilower alkanoyloxy - 11β,17α - dihydroxy - 1,4-pregnadiene-3,20-dione is subjected to the action of a dehydrating agent such as thionyl chloride or phosphorus oxychloride at a temperature of from —15° C. to 20° C. The resulting pregnatriene is then treated with an N-bromo-acid amide which can generate in situ the elements of hypobromous acid such as, for example, N-bromoacetamide, N-bromosuccinimide, N-bromophthalimide, and the like at a temperature of 0° to 50° C. to give a 16α,21-dilower alkanoyloxy-9α-bromo-11β,17α-dihydroxy-1,4-pregnadiene-3,20-dione. These latter compounds may be treated under anhydrous conditions in the presence of an anhydrous solvent at refluxing temperatures of the solvent for one to four hours with an alkaline reagent such as potassium acetate, sodium acetate, etc. to remove hydrogen bromide and yield a 16α,21-dilower alkanoyloxy - 17α - hydroxy - 9β,11β - oxido - 1,4 - pregnadiene-3,20-dione.

The preparation of the compounds of the present invention in greater detail is described in the following specific examples.

EXAMPLE 1

16α,21-diacetoxy-17α-hydroxy-1,4,9(11)-pregnatriene-3,20-dione

A solution of 16α,21-diacetoxy-11β,17α-dihydroxy-1,4-pregnadiene-3,20-dione (200 mg.) in pyridine (10 ml.) was chilled to —5°, thionyl chloride (1 ml.) was added and allowed to stand overnight at —5° C. The mixture was poured into ice water and extracted with chloroform (200 ml.). The extract was washed with saturated saline, dried and evaporated. The resulting glass was dissolved in benzene and chromatographed on silica gel (30 g.). Chloroform eluted the desired product, which on crystallization from ethyl acetate-petroleum ether (90°–100° C.) gave 75 mg., melting point 195°–198° C. Recrystallization from the same solvent pair raised the melting point to 200°–201° C. $[\alpha]_D^{25} +6°$ ($\alpha_D+0.07°$, C=1.122, methanol), ultraviolet spectrum:

$$\lambda_{max.}^{MeOH}\ 238\ m\mu\ (\epsilon 15{,}800)$$

Analysis.—Calc'd for $C_{25}H_{30}O_7$(442.49): C, 67.85; H, 6.83. Found: C, 67.54; H, 7.09.

EXAMPLE 2

16α,21-diacetoxy-17α-hydroxy-9β,11β-oxido-1,4-pregnadiene-3,20-dione

A solution of 16α,21-diacetoxy-17α-hydroxy-1,4,9(11)-pregnatriene-3,20-dione (200 mg.) in dioxane (10 ml.) and water (2 ml.) was treated with N-bromoacetamide (80 mg.) and 10% perchloric acid (0.42 ml.). After standing for 20 minutes at 20° C., excess sodium sulfite and water was added. The resultant 16α,21-diacetoxy-9α - bromo - 11β,17α - dihydroxy - 1,4 - pregnadiene - 3, 20-dione was filtered off and washed with water. This gave 60 mg., melting point 147° (d).

A solution of 16α,21-diacetoxy-9α-bromo-11β,17α-dihydroxy-1,4-pregnadiene-3,20-dione (620 mg.) and potassium acetate (200 mg.) in absolute alcohol (150 ml.) was refluxed for 18 hours. The reaction mixture was evaporated to dryness and the residue extracted with hot ethyl acetate (500 ml.). The extract was washed with saline, dried over anhydrous magnesium sulfate and evaporated. The semi-solid residue was acetylated with pyridine (5 ml.) and acetic anhydride (2 ml.) overnight, after which the mixture was evaporated to dryness. The residue was dissolved in benzene (100 ml.) and chromatographed on silica gel (30 g.). Chloroform eluted the desired product yielding 303 mg. of hard glass. Crystallization from acetone-petroleum ether gave 223 mg., melting point 211°–215° C. (42%). Recrystallization from the same solvent pair raised the melting point to 239.5°–241° C. $[\alpha]_D^{25} \pm 0°$ (methanol).

We claim:

1. In a process of preparing 16α,21-diacetoxy-17α-hydroxy-9β,11β-oxido-1,4-pregnadiene-3,20-dione, the step which comprises reacting 16α,21-diacetoxy-11β,17α-dihydroxy-1,4-pregnadiene-3,20-dione with thionyl chloride and separating the 16α,21-diacetoxy-17α-hydroxy-1,4,9(11)-pregnatriene-3,20-dione thus obtained.

2. A method of preparing 16α,21-dilower alkanoyloxy-17α-hydroxy-1,4,9(11)-pregnatriene-3,20-dione which comprises reacting 16α,21-dilower alkanoyloxy-11β,17α-dihydroxy-1,4-pregnadiene-3,20-dione with thionyl chloride in the presence of an organic solvent.

3. A method of preparing 16α,21-diacetoxy-17α-hydroxy-1,4,9(11)-pregnatriene-3,20-dione which comprises reacting 16α,21-diacetoxy-11β,17α-dihydroxy-1,4-pregnadiene-3,20-dione with thionyl chloride in the presence of pyridine.

4. In a process of preparing 16α,21-dilower alkanoyloxy-17α-hydroxy-1,4,9(11)-pregnatriene-3,20-dione the step which comprises reacting a 16α,21-dilower alkanoyloxy 11β,17α-dihydroxy-1,4-pregnatriene-3,20-dione with thionyl chloride to obtain 16α,21-dilower-alkanoyloxy-17α-hydroxy 1,4,9(11)-pregnatriene-3,20-dione.

References Cited in the file of this patent

UNITED STATES PATENTS

| | | |
|---|---|---|
| 2,730,525 | Hogg | Jan. 10, 1956 |
| 2,773,058 | Bernstein et al. | Dec. 4, 1956 |
| 2,773,080 | Bernstein et al. | Dec. 4, 1956 |
| 2,789,118 | Bernstein et al. | Apr. 16, 1957 |
| 2,837,464 | Nobile | June 3, 1958 |

UNITED STATES PATENT OFFICE
CERTIFICATE OF CORRECTION

Patent No. 2,955,119                      October 4, 1960

William S. Allen et al.

It is hereby certified that error appears in the printed specification of the above numbered patent requiring correction and that the said Letters Patent should read as corrected below.

Column 1, lines 32 to 35, the formula should appear as shown below instead of as in the patent:

Signed and sealed this 25th day of April 1961.

(SEAL)
Attest:
ERNEST W. SWIDER
Attesting Officer

DAVID L. LADD
Commissioner of Patents